INVENTORS
HAROLD A. CARLSON
ALBERT W. ZUB
OLIN J. EICKMANN
BY
Laurence M. Goodridge
ATTORNEY

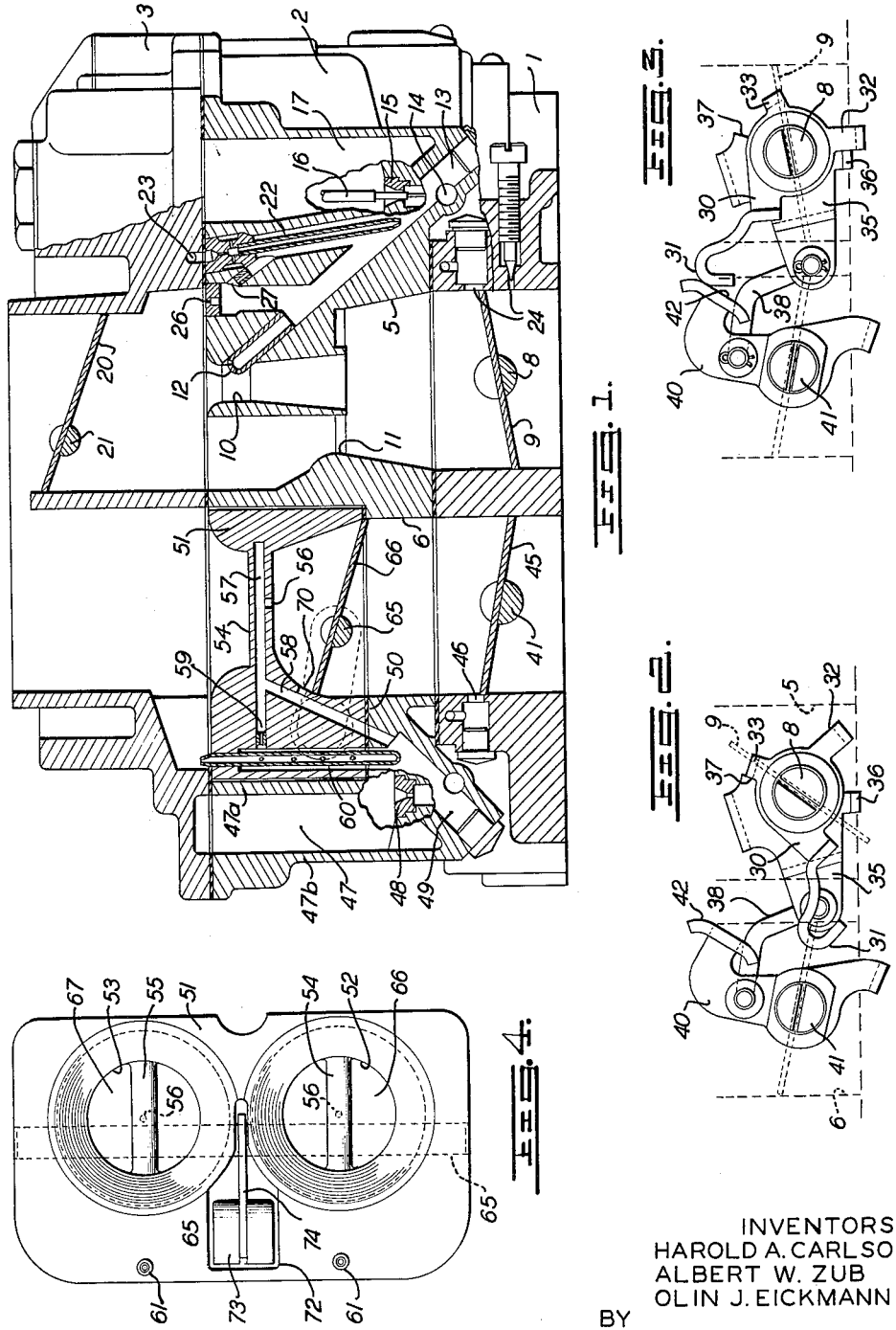
INVENTORS
HAROLD A. CARLSON
ALBERT W. ZUB
OLIN J. EICKMANN
BY
ATTORNEY Sept. 17, 1963 H. A. CARLSON ETAL 3,104,272
SECONDARY FUEL CONTROL FOR TWO-STAGE CARBURETOR
Filed Feb. 9, 1959 5 Sheets-Sheet 2
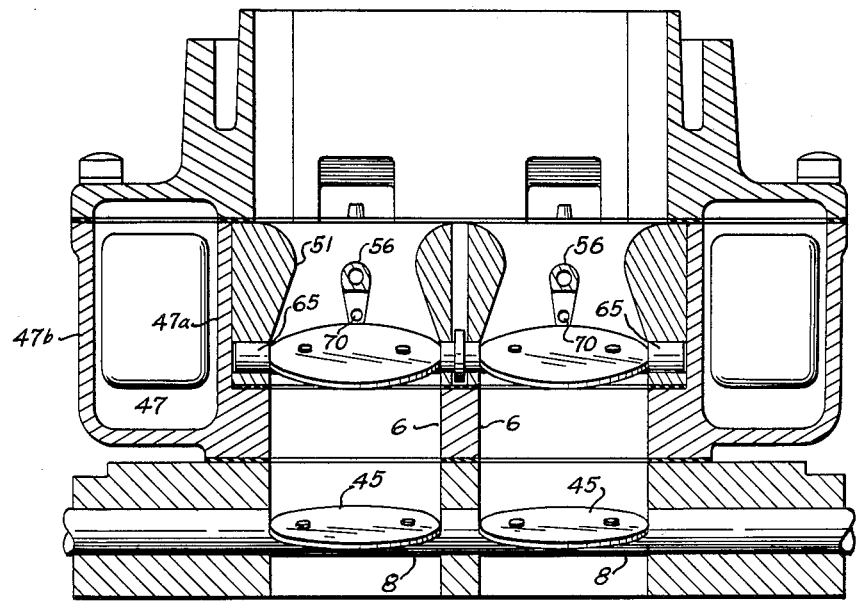
FIG. 7.
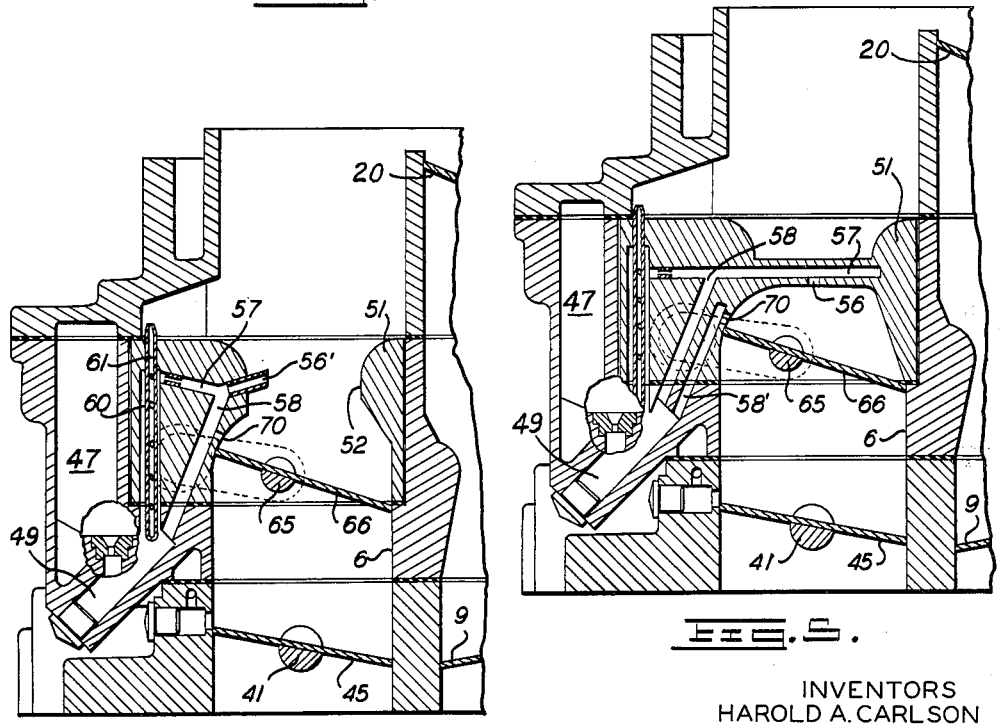
FIG. 6.
FIG. 5.
INVENTORS
HAROLD A. CARLSON
ALBERT W. ZUB
OLIN J. EICKMANN
BY
Laurence M. Goodridge
ATTORNEY INVENTORS
HAROLD A. CARLSON
ALBERT W. ZUB
OLIN J. EICKMANN
BY
*Lawrence M. Goodridge*
ATTORNEY Sept. 17, 1963 H. A. CARLSON ETAL 3,104,272
SECONDARY FUEL CONTROL FOR TWO-STAGE CARBURETOR
Filed Feb. 9, 1959 5 Sheets-Sheet 4
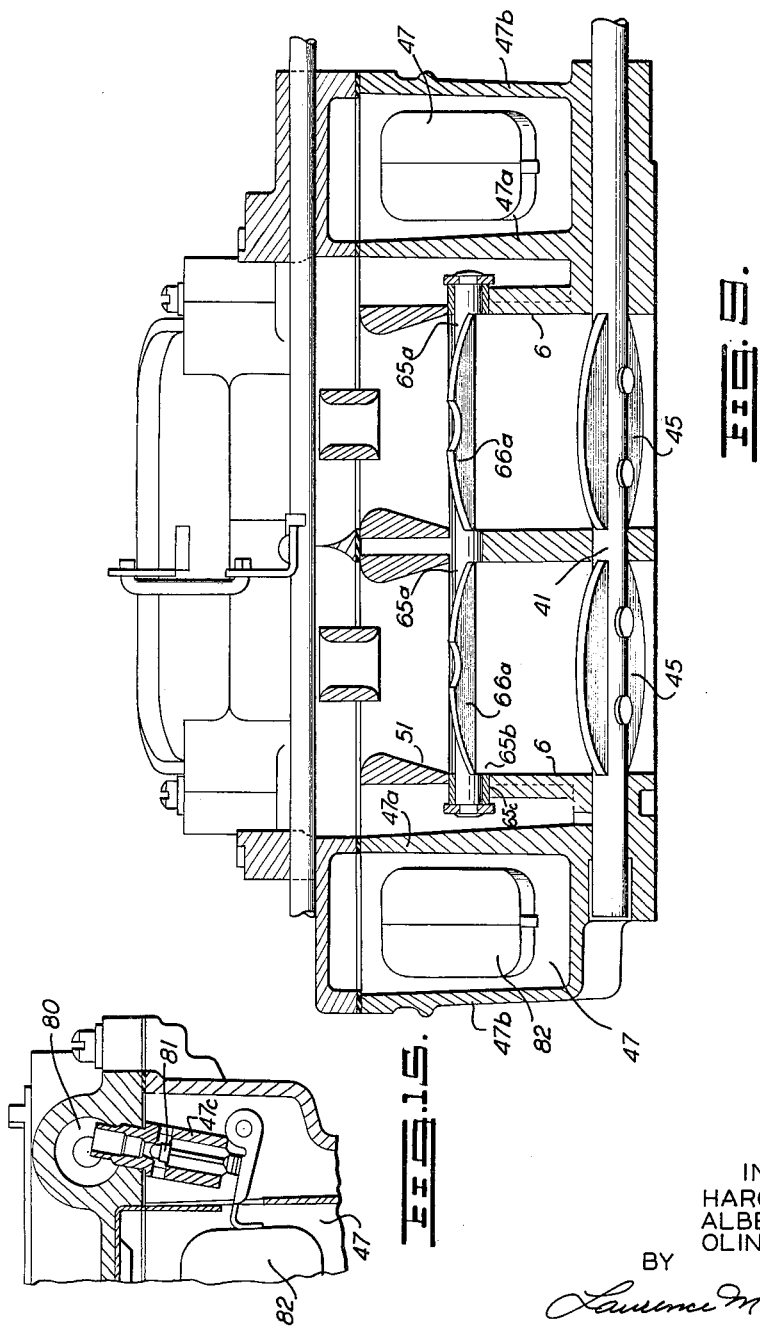
INVENTORS
HAROLD A. CARLSON
ALBERT W. ZUB
OLIN J. EICKMANN
BY
Lawrence M. Goodridge
ATTORNEY Sept. 17, 1963  H. A. CARLSON ETAL  3,104,272
SECONDARY FUEL CONTROL FOR TWO-STAGE CARBURETOR
Filed Feb. 9, 1959  5 Sheets-Sheet 5

United States Patent Office 3,104,272
Patented Sept. 17, 1963

3,104,272
SECONDARY FUEL CONTROL FOR TWO-STAGE
CARBURETOR
Harold A. Carlson, Brentwood, Albert W. Zub, St. Louis, and Olin J. Eickmann, Normandy, Mo., assignors to ACF Industries, Incorporated, New York, N.Y., a corporation of New Jersey
Filed Feb. 9, 1959, Ser. No. 792,000
13 Claims. (Cl. 261—23)

This application is a continuation-in-part of application Serial No. 566,609, filed February 20, 1956, now Patent No. 2,890,031 of June 9, 1959.

The invention relates primarily to the mounting of velocity throttles in the secondary mixture conduits.

The invention is shown applied to the secondary stages of a multi-stage, multi-barrel carburetor of the four-barrel type in conjunction with which it is deemed especially useful and beneficial for reasons appearing hereinafter.

One of the reasons for the adoption of the four-barrel carburetor was to obtain higher engine torque output over a larger range of engine speeds than was possible with the single or dual carburetor. From the operator's point of view, however, any lack of smoothness in the transition from single to multiple-stage operation in the four-barrel carburetor is objectionable, which means that multi-stage performance of the four-barrel carburetor in this respect must be comparable with that of the single or dual. Many different expedients in carburetor structure have been proposed and tested as solutions for this problem.

According to this invention, the secondary stages of the carburetor are controlled by two pairs of throttles, one of which is mechanically actuated from the primary throttle, and the other of which is automatically responsive to suction and velocity in the air flow through the secondary stages.

One object of the invention is the novel mounting of the velocity throttles in a four-barrel carburetor as a separable, replaceable unit, the shaft of the velocity throttles being so constructed and arranged as to avoid penetration of the wall or walls of the fuel chambers to prevent leakage.

The invention includes other novel features, one of which is the provision of an integral removable unit which may contain both the fuel nozzles and the velocity throttles, or which may form in whole or in part the venturi structure and provide a support or fastener for the removable velocity throttle shaft, these parts being separately constructed and adapted for assembly in the carburetor, thus adding versatility to the construction, permitting a ready means of interchangeability for required conditions of flow capacity to meet various conditions in engines of different values.

Further objects and advantages of the invention will become apparent as this description proceeds, when taken with the showing in the accompanying drawings, in which:

FIG. 1 is a side elevation, partly in section, of a conventional four-barrel carburetor showing the construction of the primary and secondary stages and illustrating an embodiment of the invention;

FIG. 2 and FIG. 3 illustrate the mechanism for mechanical operation of the secondary throttles from the primary throttles;

FIG. 4 is a top view of the removable nozzle unit;

FIG. 5 is a side elevation, in section, of a carburetor partly broken away to illustrate a modified form of the invention disclosed in FIG. 1;

FIG. 6 is a side elevation of a carburetor, partly in section, broken away to illustrate a still further modification of the invention disclosed in FIG. 1;

FIG. 7 is a vertical sectional view showing the velocity throttle shaft in elevation;

FIG. 9 is a vertical longitudinal section of the carburetor shown in FIG. 8;

FIG. 15 is a fragmentary sectional view showing the fuel inlet and controlling float.

Figure 8:
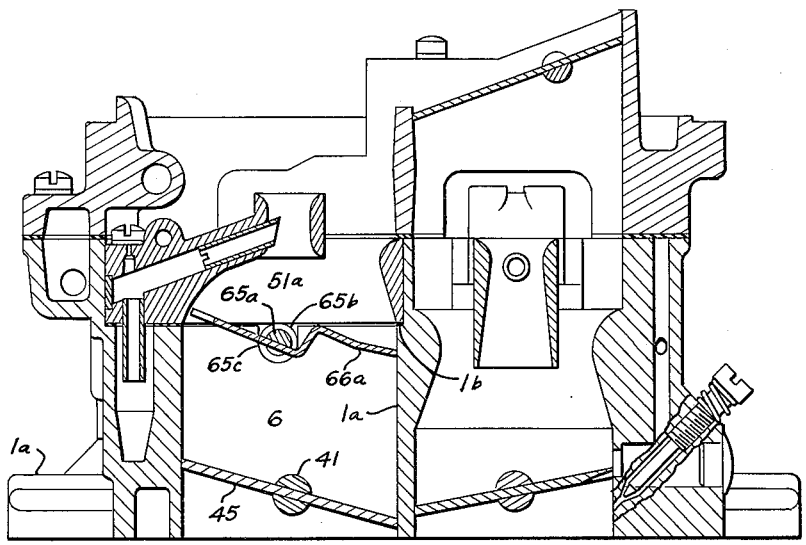
FIG. 8 is a vertical transverse section of a modified type of carburetor showing the primary and secondary stages with a modified mounting for the velocity throttle.
Figure 11:
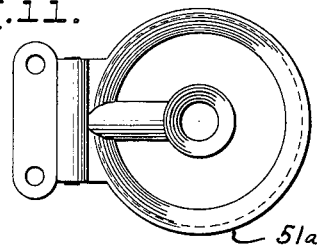
FIG. 11 is a top plan view of the venturi nozzle block used in the carburetor shown in FIG. 8.

FIG. 1 illustrates a part of a four-barrel carburetor. The section is taken through the primary and secondary barrels of one side thereof. Since the carburetor as a whole forms no part of the present invention, it will not be described except to state that the invention can be applied to any carburetor, and especially to any four-barrel type of carburetor of the multi-stage type such as shown in greater detail by the patent to Carlson et al., 2,715,522, of August 16, 1955.

The carburetor shown in FIG. 1 has a throttle body 1, a float bowl section 2, and an air horn 3 secured in superimposed relation, as is conventional in the art. These parts are so constructed as to provide a pair of primary mixture conduits 5, one of which is shown, and a pair of secondary mixture conduits 6, one of which is shown. The primary mixture conduits within the throttle valve body 1 mount a rotatable primary throttle shaft 8 to which is secured primary throttles 9. Within the primary mixture conduits 5 in the float bowl section 2 are primary and secondary venturi 10 and 11. Fuel nozzles 12 project within the primary venturi 10, and are supplied with fuel by way of main mixture passages 13, cross fuel passage 14, and metering jets 15 controlled by step metering rods 16. The jets 15 are located within the fuel bowl 17, which supplies both primary fuel nozzles 12. Mixture conduits 5 also mount a choke valve 20 on a choke shaft 21. The fuel system also includes idle tubes 22 supplying fuel by way of passages 23 to the idle ports 24 adjacent throttles 9. The fuel system may also be equipped with the usual air bleeds 26 and 27. The structure so far described is conventional carburetor structure and a further detailed description of its construction and operation will serve no useful purpose here.

Referring to FIGS. 2 and 3, one end of the throttle shaft 8 carries a fixed lever 30 which rotates with the shaft 8. On the lever 30 is a cam 31 and arm 32, and a laterally extending lug 33. Rotatably mounted on the shaft 8 is an operating lever 35 carrying a forwardly extending lug 36 and an abrupt shoulder 37. A link 38 connects lever 35 with a similar lever 40 fixed to the secondary throttle shaft 41. A cam surface 42 formed on the lever 40 cooperates with the cam surface 31 on the lever 30.

The portion of the mixture conduits 6 within the throttle body 1 has throttles 45 secured to and operated by secondary throttle shaft 41. The secondary throttles 45, in turn, control like idle ports 46 supplied with fuel from fuel bowl 47 by way of metering jets 48 and suitable passages similar to the passages 23 on the primary side. Main fuel supply passages 49 extend upwardly to ports formed in a shoulder 50 extending completely around the periphery of both secondary mixture conduits 6. Seated on the shoulder 50 is a block 51 in which is formed a pair of venturi surfaces 52 and 53 (see FIG.

4). Each venturi has respectively a fuel nozzle bar 54 and 55 which are identical in construction so that the description of one will serve for both.

Returning to FIG. 1, fuel bar 54 has a fuel nozzle 56 connected by suitable passages 57 and 58 with a port in the bottom of the block 51 registering with the passage 49. In the fuel passage 57 is a metering restriction 59 for controlling the connection with a well 60 containing vent tube 61. The well 60 is supplied with fuel from the main fuel passage 49.

Returning to FIG. 4, the block 51 is transversely bored for supporting a throttle shaft 65 eccentrically mounted with respect to the venturi 52 and 53 and the secondary mixture conduits 6. This shaft supports a pair of unbalanced throttle plates 66 and 67 so mounted that one edge of each controls a fuel port 70 connecting with the passages 58.

Within the block 51 is a recess or slot 72 which receives a weight 73 secured on an arm 74 and, in turn, rigidly fixed to the throttle shaft 65. The weight 73 tends to retain the throttles 66 and 67 closed against the force of suction acting upon the unbalanced throttles.

The block 51 containing the venturi 52 and 53 is secured in place within the float bowl section 2 by the float bowl cover on the air horn 3. It is thus readily removable and replaceable, and may be manufactured in varying sizes to fit any carburetor, so that in each carburetor the size of the secondary fuel passages is readily variable by means of the interchangeability provided.

The fuel bowl 47 is defined in part by inner wall 47a and outer wall 47b. This fuel bowl is of sufficient dimension to retain an appropriate quantity of fuel at all times as determined by the float valves indicated generally at 47c (FIG. 15).

Figure 10:
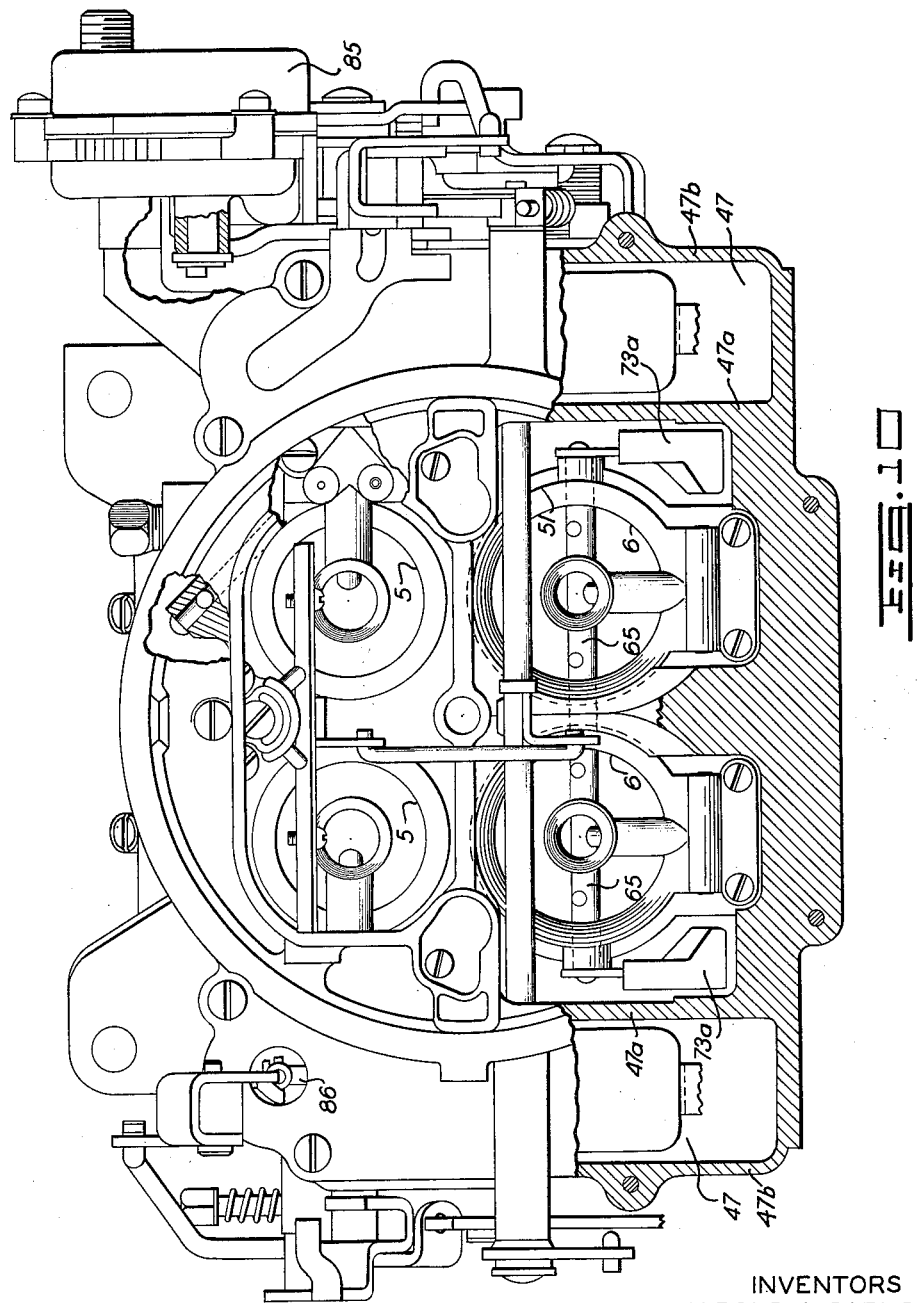
FIG. 10 is a top plan view, partly in section, of the assembly of FIGS. 8 and 9.

In FIG. 7 the section illustrates the velocity throttle shaft 65 in elevation and the termination of the ends of this throttle shaft 65 inward of the inner wall 47a of the float bowl 47. The throttle shaft 65, as shown in FIGS. 4 and 7 as well as the other modifications to be hereinafter described, may terminate either generally flush with the outer face of the insert block or may project slightly therebeyond to accommodate terminal weights in lieu of the medial weight of the first form of the invention and shown clearly in FIG. 4 by reference character 73. The weights 73 may be arranged at the extremities of the shaft 65 in appropriate pockets as shown in FIGS. 9 and 10 and designated by reference character 73a. In either event the weights 73 or 73a are provided to constitute a force opposing the opening movement of the velocity throttle due to the velocity of air and suction through the mixture conduit.

As shown in FIG. 2, opening movement of the primary throttles 8, which are usually manually controlled, moves the lug 33 into contact with the shoulder 37 at the same time cam surface 31 is moved with respect to cam surface 42. Further opening movement of the primary throttle from the position shown in FIG. 2 is transmitted to the secondary throttle shaft 41 through the link 38. This connection is so constructed that both throttles, primary and secondary, will reach a wide-open position simultaneously.

During the reverse action, the closing movement of the primary throttle shaft engages the cam surfaces 31 and 42 to move the secondary throttle shaft 41 in a direction to close the secondary throttles 45. During closing movement, lug 36 is engaged by arm 32 so as to positively close the secondary throttles.

When the engine is operating with both throttles closed, fuel will be fed to the engine by way of idle ports 24 in the primary mixture conduits 5 and idle ports 46 in the secondary mixture conduits 6. With both the primary and secondary throttles open, the degree of suction present will determine the position of the velocity throttles 66 and 67, which will be yieldingly urged to the closed position by the weight 73 on the arm 74. However, when the velocity throttles 66 and 67 begin to open, they immediately uncover a portion of the fuel ports 70, so that even though the secondary throttles 45 have passed beyond the idle ports 46, and these ports are no longer functioning strongly for this reason, fuel will be immediately available from the fuel port 70 at the edge of the throttles 66 and 67 due to the presence of suction below these throttles, since engine suction is necessary to open these throttles for the passage of air. The fuel ports 70 will continue to function strongly after the unbalanced throttles 66 and 67 have reached a position far enough to effect a fuel flow directly from the main fuel nozzles 56.

The embodiment illustrated in FIG. 5 differs from that shown in FIGS. 1 and 4 only to the extent that the fuel nozzles 56 and 70 are interconnected with the main fuel supply passages 49 by separate passages, one indicated as 58 and the other as 58'. Otherwise the construction is identical, and a further description is deemed unnecessary for a complete understanding of the particular construction.

Separate passages 58 and 58' are desirable to prevent the operation of the fuel ports 70 from interfering with the flow of fuel to the main fuel ports 56. Since both passages 58 and 58' extend to a point below the level of fuel in the fuel bowl 47, it is quite obvious that the operation of one will be completely independent of the operation of the other.

In the modification shown in FIG. 6, the construction is identical with that above described except that the main fuel nozzles 56' open directly into the throat of the venturi 52 and 53. Otherwise this modification has the fuel ports 70 and similar passages 58 and 57 connecting with main fuel passages 49 and with wells 60, all as above described.

The operation of FIG. 6 is similar to that already described above, and can be readily understood from the preceding detailed description.

In the form of the invention shown in FIGS. 8 through 13, the basic features of the carburetor contain the same reference characters as in the first form, the modification of the structure of these figures being in the arrangement of the velocity throttle shaft and its relationship to the associated parts and particularly to the venturi and manual throttles. In the form of the invention shown in FIGS. 8 and 9, the velocity throttles 66a are mounted on a shaft 65a and the latter is journaled in bushings 65b located in oppositely positioned recesses 65c. The recesses 65c are formed at the top edge of the mixture conduits 6 of the base throttle casting 1a which latter is formed with an annular shoulder 1b (FIG. 8) for receiving the insert block 51a. The shoulder 1b is flush with the top of the bushings 65b when the latter are in position in recesses 65c so that the insert block 51a when seated rests upon the top of the bushing 65b and retains and positions the same. The insert block 51a, therefore, positions and retains the velocity throttle mounting and when the insert block 51a is removed the velocity throttle assembly can likewise be removed and replaced.

Figure 14:
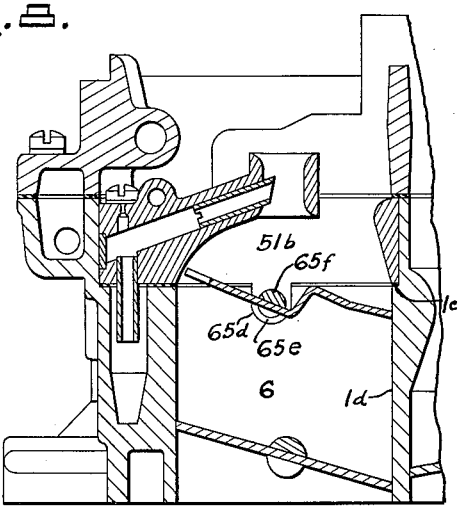
FIG. 14 is a fragmentary vertical section showing another modified form of velocity throttle mounting.
Figure 12:
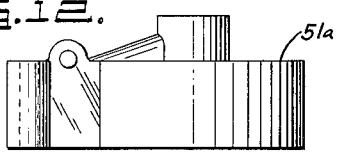
FIG. 12 is a side elevation of a venturi block of FIG. 11.
Figure 13:
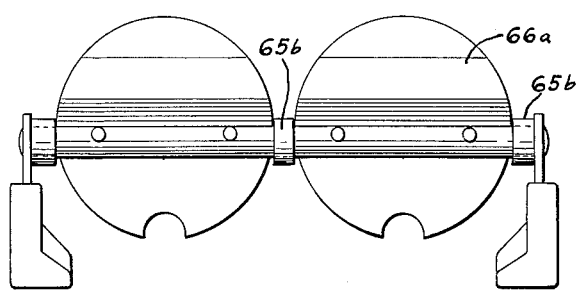
FIG. 13 is a top plan view of the velocity throttle assembly shown in FIGS. 9 and 10.

In the form of the invention shown in FIG. 14, the insert block 51d rests on the shoulder 1c of the base casting 1d. This base casting is provided with the oppositely arranged U-shaped recesses 65d which receive the depending oppositely positioned U-shaped lugs 65e suitably bored to receive the terminals of the velocity shaft 65f. In this form of the invention the notches in the base casting 1d provide anchorage for the depending lugs 65e which are carried and positioned by the insert block 51b. In both illustrations the velocity throttle is unbalanced and weighted so as to function in accordance with the passage of the mixture through the conduits in the assembly.

In all of the forms of the invention it will be seen that the velocity throttle shaft is removably positioned and/or secured in its mounting by the removable block or insert and it will further be seen that this velocity shaft terminates inward of the wall of the float chambers containing the fuel. By this arrangement it is not necessary to penetrate the fuel chambers with the velocity shaft which would tend to cause leakage of the fuel from the fuel chamber. In addition the velocity shaft and the insert block which is associated with the venturi, and may form a part of the venturi, is removable so that these parts can be selectively replaced in accordance with requirements.

It is to be understood that the fuel is normally supplied to the float chambers 47 through inlets indicated at 80 (FIG. 15), which inlets are opened in accordance with the fuel level as regulated by valves 81 controlled by floats 82. It will also be understood that the operation of the manual throttles in both the primary and secondary mixture conduits is coordinated by suitable mechanism such as shown in FIGS. 2 and 3 so that these throttles will function to provide the proper quantity of fuel in accordance with requirements.

In FIG. 10 a top plan view of a four-barrel carburetor is shown to more clearly illustrate the arrangement of parts. In FIG. 10 the relationship of the primary mixture conduits 5 and the secondary mixture conduits 6 are illustrated in top plan, with parts removed to show the end dual weights 73a in lieu of the medial dual weight on the velocity throttle shaft of FIG. 4. Also in FIG. 10 the automatic choke 85 mechanism and accelerating pump 86 are combined in the assembly.

A construction has been described which will fulfill all the objects of the invention set forth above, but it is contemplated that still other modifications will occur to those skilled in the art which come within the scope of the appended claims.

We claim:
1. An interchangeable venturi block for a carburetor, said block comprising an annular passage having an inner venturi surface adapted to be aligned with the carburetor air inlet, a main fuel passage in said block terminating at one end in a nozzle outlet within said annular passage and at the other end at an opening in the surface of said block adapted to be connected to a fuel well in said carburetor, an auxiliary fuel passage through said block terminating at one end in a fuel port opening into said annular passage downstream of said venturi surface and adapted to be connected to said fuel well at the surface of said block.

2. An interchangeable venturi block for a carburetor, said block comprising an annular passage having an inner venturi surface adapted to be aligned with the carburetor air inlet, a main fuel passage in said block terminating at one end in a nozzle outlet within said annular passage and at the other end at an opening in the surface of said block adapted to be connected to a fuel well in said carburetor, an auxiliary fuel passage through said block terminating at one end in a fuel port opening into said annular passage downstream of said venturi surface, a metal tube supported at one end in said block with the other end thereof extending from said block and adapted to be inserted within said fuel well, and a connection within said block connecting said tube to one of said fuel passages.

3. The invention of claim 2 including a rotatable shaft journaled in said block and extending transversely through said annular passage, and a throttle valve fixed to said shaft within said annular passage for movement from an open to a closed position.

4. An interchangeable venturi block for a carburetor, said block comprising a pair of annular passages each having an inner venturi surface adapted to be aligned with the carburetor air inlet, a pair of main fuel passages in said block each terminating at one end in a nozzle outlet within a different one of said annular passages and at the other end at an opening in the surface of said block adapted to be connected to a source of fuel within said carburetor, a pair of auxiliary fuel passages through said block with each terminating at one end in a fuel port opening into a different one of said annular passages downstream of said venturi surface thereof and adapted to be connected to said fuel source.

5. The invention of claim 4 including a rotatable shaft journaled in said block and extending transversely through said annular passages, and a different throttle valve fixed to said shaft within each one of said annular passages for movement from a closed to an open position.

6. The invention of claim 5 wherein said fuel ports are positioned respectively within said annular passages adjacent to the closed position of the edge of said throttle valve mounted therein.

7. The invention of claim 5 including a lever arm fixed at one end to said shaft, and a weight supported by the other end of said lever to gravity bias said throttles toward a closed position.

8. The invention of claim 7 wherein said lever arm and weight are mounted for movement with said shaft within a recess formed in said block.

9. A carburetor comprising a body having a mixture conduit therethrough, a fuel reservoir formed within said body, a removable venturi block mounted within said carburetor body and including an annular passage having an inner venturi surface aligned with and forming a part of said mixture conduit, a main fuel passage in said block terminating at one end in a nozzle outlet within said venturi surface and at the other end at a first opening in the surface of said block, an auxiliary fuel passage through said block terminating at one end in a fuel port opening into said annular passage downstream of said venturi surface and at the other end in a second opening in the surface of said block, passage means in said body connecting said first and second openings to said fuel reservoir.

10. A carburetor comprising a body having a mixture conduit therethrough, a fuel reservoir formed within said body, a removable venturi block mounted within said carburetor body and including an annular passage having an inner venturi surface aligned with and forming a part of said mixture conduit, a main fuel passage in said block terminating at one end in a nozzle outlet within said venturi surface and at the other end at the surface of said block, an auxiliary fuel passage through said block terminating at one end in a fuel port opening into said annular passage downstream of said venturi surface and at the other end in the surface of said block, passage means in said body connecting said main and auxiliary fuel passages to said fuel reservoir.

11. The invention of claim 10 including a rotatable shaft journaled in said block, a throttle valve fixed to said shaft for movement from a closed to an open position, said fuel port being positioned adjacent to the closed position of the edge of said throttle valve.

12. A carburetor comprising a body having a pair of mixture conduits therethrough, a fuel reservoir formed within said body, a removable venturi block mounted within said carburetor body and including two annular passages each having an inner venturi surface aligned with and forming a part of a different one of said mixture conduits, two main fuel passages in said block each terminating at one end in a nozzle outlet within a different one of said venturi surfaces and at the other end in the surface of said block, two auxiliary fuel passages through said block each terminating at one end in a fuel port opening into a different one of said annular passages downstream of the venturi surface thereof and at the other end in the surface of said block, passage means in said carburetor body connecting said main and auxiliary fuel passages to said fuel reservoir.

13. The invention of claim 12 including a rotatable shaft journaled in said block, two throttle valves fixed to said shaft for movement therewith, each one of said throttle valves being positioned within a different one of said annular passages for movement between an open and a closed position, each one of said fuel ports being positioned adjacent to the closed position of the edge of said throttle valve positioned within the respective annular passage.

References Cited in the file of this patent
UNITED STATES PATENTS

| | | |
|---|---|---|
| 1,958,542 | Kirby | May 15, 1934 |
| 2,291,418 | Storer | July 28, 1942 |
| 2,715,522 | Carlson et al. | Aug. 16, 1955 |
| 2,793,844 | Olson | May 28, 1957 |
| 2,821,371 | Stoltman | Jan. 28, 1958 |